United States Patent Office 3,522,148
Patented July 28, 1970

3,522,148
STABILIZED THROMBOPLASTIN PREPARATION
John N. Adam, Jr., and John F. Eberhard, Miami, Fla., assignors to Dade Reagents, Inc., Miami, Fla., a corporation of Florida
No Drawing. Filed Aug. 13, 1965, Ser. No. 479,623
Int. Cl. G01n 33/16
U.S. Cl. 195—99      2 Claims

ABSTRACT OF THE DISCLOSURE

An improved thromboplastin preparation intended for use in the diagnosis of blood coagulation behavior. The liquid preparation consists a mixture of a saline extract of brain tissue and an aqueous calcium salt solution, the calcium salt solution including as a principal anion the anion of a sugar acid salt such as calcium tartrate, calcium gluconate, calcium citrate, or calcium lactate.

---

In the now widely-used coagulation procedures taught by Quick [190 Am. J. Med. Sci. 501 (1935)] and others, the activity of prothrombin is measured by its capacity to form thrombin, which in turn activates the formation of the clot. The test reaction commences when all of the ingredients (a sample or decalcified blood plasma, thromboplastin, and calcium) are present. Where the test is to be run on only a single sample of plasma, the plasma and thromboplastin may first be combined and the reaction then initiated by the addition of a fixed amount of calcium in combined form as calcium chloride.

While such a sequence of steps is satisfactory where only a single test is to be run, it is clearly not well suited for the testing of multiple samples. For efficient mass testing, it is desirable to mix the thromboplastin and calcium chloride first, and then add measured amounts of the premixed thromboplastin-calcium reagent to each of the plasma samples. A number of tests may thus be conducted in quick succession or, in some cases, simultaneously (as where a battery of semi-automatic coagulation detecting devices are used). The desirability of first preparing a thromboplastin-calcium reagent has become particularly evident with the increasing use of mass testing techniques and especially with the increasing popularity of automatic or semi-automatic testing devices which simplify and facilitate such mass testing.

There is, however, one basic problem which limits the effectiveness of such testing devices and which, in general, complicates and limits mass testing procedures. When a thromboplastin solution (a saline extract of acetone-dried brain tissue) is mixed with a calcium chloride solution, the mixture is unstable and deteriorates rapidly. At the normal incubation temperature for conducting a coagulation test (37 degrees C.), such a mixture may become inactive in 15 minutes or less.

Efforts have been made in the past to simplify a technician's task by making available a dry mixture of thromboplastin and calcium which the technician may then quickly reconstitute by simply adding water. While such a preparation eliminates the step of mixing solutions together at the commencement of a test, another step, that of reconstituting the preparation, is substituted. Furthermore, it has been found that the reconstituted preparation tends to be even more unstable than the mixture of thromboplastin and calcium chloride solutions and, therefore, any advantages in using a stable dry premix are more than offset by the disadvantage of even greater instability following reconstitution of the reagents.

Accordingly, it is a main object of the present invention to provide a thromboplastin preparation which overcomes the aforementioned defects and disadvantages. Specifically, it is a principal object of this invention to provide a liquid preparation containing both thromboplastin and calcium which exhibits far greater stability than other prior liquid thromboplastin-calcium preparations and which, over extended storage periods, retains an effectiveness for use in blood coagulation determinations equal to a fresh mixture of thromboplastin and calcium chloride solutions.

Other objects will appear as the specification proceeds.

An important aspect of the present invention lies in the discovery that the chloride ion is not a significant cofactor in coagulation and that the substitution of certain organic anions for the chloride ion will avoid the rapid deterioration known to occur in the usual mixture of thromboplastin and calcium chloride solutions. Such deterioration of prior solutions is believed to result from the precipitation of insoluble calcium salts with lipid materials from which thromboplastin is not entirely divorced. The calcium thus precipitated from such prior solutions is no longer available to activate the conversion of prothrombin to thrombin.

More specifically, our invention lies in recognizing that the substitution of the calcium salts of sugar acids for calcium chloride in an otherwise typical thromboplastin-calcium preparation prevents or retards the formation of insoluble salts without, at the same time, impairing the activity of calcium as an essential factor in coagulation. Furthermore, such retardation occurs even where the chloride ion is also present, as where a minor proportion of calcium is included as the chloride salt.

All of the major sugar acid salts of calcium have been found suitable for practicing our invention. Specifically, a stabilized thromboplastin preparation embodying the invention may include calcium tartrate, calcium gluconate, calcium lactate, or calcium citrate. There is no concentration range for the sugar acid salt because the calcium concentration of the total thromboplastin reactant has already been established or standardized at 0.01 M as the chloride, and the replacement of the chloride by the organic anion is stoichiometric. However, in any preparation which contains chloride as well as the organic anions, the organic anions (tartrate, gluconate, citrate, or lactate) should predominate.

Except for the substitution of a sugar acid calcium salt for calcium chloride, the steps of preparing the thromboplastin reagent are essentially the same as those which have been previously performed and which are well known in the art. Dehydration of rabbit brain tissue is effected by acetone, the tissue being triturated with acetone until a granular non-adhesive product is obtained. The thromboplastin product is then fully dried. To prepare the thromboplastin emulsion, the dry material is mixed with physiological saline (0.85 percent sodium chloride solution) in the ratio of 0.2 gms. dried brain tissue to 5–6 cc. saline. The emulsion is then incubated for 15 to 40 minutes at 48–50° C.

To the saline extract is then added an equal volume of an aqueous solution of a calcium salt of one or more of the sugar acids already mentioned, the calcium salt solution having an anionic concentration equivalent to a 0.01 M solution of calcium chloride. If desired, a minor proportion of phenol, or homologuous materials like thymol or hexachlorophene, may be added to combat microbial activity and thereby assist in extending the storage life of the preparation.

It has been found that a preparation, aseptically prepared as described above, retains its effectiveness for use in blood coagulation tests, even after extended periods of storage. No appreciable change or degradation of the product has been detected after storage at refrigeration temperatures (0 to 10° C.) in excess of six months, and

3 it is believed that such effectiveness can be retained almost indefinitely, certainly for periods in excess of one year. By way of contrast, a conventional preparation, utilizing only the chloride salt as the calcium source, has an effective storage limit at the same refrigeration temperatures of approximately eight days.

Quite suprisingly, the presence of the chloride ion in a preparation where the principal anion is gluconate, lactate, tartrate, or citrate, does not appear to have a significant effect on the stability of the preparation. For reasons which are not fully understood at present, the large organic anions impede some naturally predominant tendencies toward precipitation and lend themselves to a stable thromboplastin-calcium admixture which is stable (as measured by the Quick one-stage prothrombin time) for extended storage periods under refrigeration.

To provide a fuller understanding of the invention, the following illustrative examples are set forth:

EXAMPLE I

A stable thromboplastin preparation embodying the invention may be made as follows:

The thromboplastin material is prepared in a manner well-known in the art. Fresh rabbit brains are ground and desiccated by acetone. The first wash should involve no more acetone than is necessary to produce a 50 percent aqueous mixture, accounting for the approximate 90 percent water content of the tissue. Four additional acetone washes then remove all traces of contaminants.

The acetone is then separated from the solids by the use of a gootch extractor and the residual acetone is removed by drying the tissue at 37° C. for 30 minutes.

The dried brain tissue is then leached at 48° C. for 30 minutes with a saline having a solid content equated to 0.85 percent sodium chloride and having a substantially neutral pH. 600 ml. saline are used for each 20 gm. of tissue. The product is then centrifuged and the supernatant is decanted. 7 ml. of commercial grade phenol are added to each 2 liters of product resulting in a phenol concentration of approximately 0.34 percent.

The saline-activated brain thromboplastin (20 ml.) is then mixed with an equal volume (20 ml.) of 0.02 M calcium lactate and the mixture is stored at 5 to 10° C.

Such mixture was tested directly following its preparation by combining 0.2 ml. thereof with 0.1 ml. fresh normal plasma. Normal 12 second range prothrombin time values were recorded. Similar values within the normal 12 second range were recorded when similar tests were run on the stored mixture on the 180th, 185th, and 190th days following preparation.

EXAMPLE II

The procedure set forth in Example I was followed using calcium gluconate as the calcium salt rather than calcium lactate. 20 ml. of 0.01 M calcium gluconate (gluconate carries 2 atoms of calcium) were mixed with 20 ml. of the saline-activated brain thromboplastin and the mixture was then stored at 5 to 10° C.

Periodic tests of the mixture were made over a 190th day period following preparation of the mixture, such tests being conducted as set forth in Example I. Normal 12 second range prothrombin time values were obtained in each test.

EXAMPLE III

The same procedure as set forth in Example I was followed except that 20 ml. of 0.01 M calcium tartrate (tartrate carries 2 calcium atoms per mole) were substituted for calcium lactate in making the final mixture. Periodic testing over a period in excess of six months, using the procedure set forth in Example I, revealed normal 12 second range prothrombin time values for each determination.

EXAMPLE IV

The procedure of Example I was followed except for the substitution of 20 ml. of 0.007 M calcium citrate (calcium citrate contains 3 atoms of calcium and 2 atoms of citrate) for the calcium lactate. Periodic tests performed with fresh normal plasma gave prothrombin time values in the 13 second range which may be regarded as normal and interpretations can be made according to this control calibration.

EXAMPLE V

Stable liquid thromboplastin preparations may alternatively be prepared by introducing the salt of a sugar acid at an earlier stage than set forth in Example I and thereafter mixing the thromboplastin solution with equal volumes of 0.02 M calcium chloride solution.

The procedure is the same as set forth in Example I with respect to the preparation of the dried brain tissue. The tissue is then leached at 48° C. for 30 minutes with a saline having a solid content equated to 0.85 percent sodium chloride, such saline being prepared by any of the three following methods:

(A)

Distilled water—100 ml.
Sodium gluconate—0.2 gm.
Sodium chloride—0.65 gm.

(B)

Distilled water—100 ml.
Sodium lactate—0.4 gm.
Sodium chloride—0.45 gm.

(C)

Distilled water—100 ml.
Sodium tartrate—0.22 gm.
Sodium chloride—0.63 gm.

To each 600 ml. of any of the three saline preparations given above, 20 gm. of the dried brain powder were added. The preparations were centrifuged, decanted, and treated with phenol as set forth in Example I.

To each of the three preparations was added an equal volume of 0.02 M calcium chloride solution (using 20 ml. of the saline-activated brain thromboplastin and 20 ml. of the calcium chloride solution) and the mixtures were stored at 5 to 10° C.

Periodic testing of such preparations over a five month test period, using the testing procedure set forth in Examples I–IV, revealed normal 12–13 second range prothrombin time values, demonstrating that the large gluconate, lactate, and tartrate anions effectively stabilized the thromboplastin preparation despite the presence of calcium chloride.

While we have disclosed the present invention in considerable detail for purposes of illustration, it will be understood by those skilled in the art that many of these details may be varied without departing from the spirit and scope of the invention.

We claim:

1. A stabilized thromboplastin preparation for use in blood coagulation tests comprising an equal volume mixture of (a) a saline extract of acetone-dried brain tissue and a salt selected from the group consisting of sodium tartrate, sodium gluconate, sodium citrate and sodium lactate, and (b) an aqueous solution of calcium chloride.

2. A stabilized thromboplastin preparation for use in blood coagulation tests comprising an equal volume mixture of a saline extract of acetone-dried brain tissue and an aqueous solution of a calcium salt of a sugar acid selected from the group consisting of calcium tartrate, calcium gluconate, calcium citrate and calcium lactate.

References Cited

FOREIGN PATENTS 813,896    5/1959    Great Britain.
1,041,644    10/1958    Germany.

(Other references on following page)

OTHER REFERENCES

Tocantins, The Coagulation of Blood, Grune & Stratton, N.Y. 1955, pp. 100–102.

Seegers, reprint Blood, The J. of Hematology, vol. V, May 1950, p. 430.

McClaughry, reprint Blood, The J. of Hematology, vol. V, April 1950, p. 303.

Duraffourd, Le Sang, vol. 31, No. 4, 1960, pp. 339–348.

ALBERT T. MEYERS, Primary Examiner

A. P. FAGELSON, Assistant Examiner

U.S. Cl. X.R.

195—63, 103.5; 424—2, 95, 101

PO-1050
(5/69)

UNITED STATES PATENT OFFICE
CERTIFICATE OF CORRECTION

Patent No. 3,522,148                    Dated July 28, 1970

Inventor(s) John N. Adam, Jr. and John F. Eberhard

It is certified that error appears in the above-identified patent and that said Letters Patent are hereby corrected as shown below:

Column 1, in the heading, change "Dade Reagents, Inc., Miami, Fla., a corporation of Florida" to "American Hospital Supply Corporation, Evanston, Illinois, a corporation of Illinois".

OCT 27 1970

(SEAL)
Attest:

Edward M. Fletcher, Jr.
Attesting Officer

WILLIAM E. SCHUYLER, JR.
Commissioner of Patents